(12) United States Patent
Tamura et al.

(10) Patent No.: US 6,540,280 B2
(45) Date of Patent: Apr. 1, 2003

(54) STRUCTURE FOR STORING ROOF AND REAR PILLAR OF CONVERTIBLE HARDTOP

(75) Inventors: Michio Tamura, Utsunomiya (JP); Tatsuya Ohara, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/187,993

(22) Filed: Jul. 3, 2002

(65) Prior Publication Data

US 2003/0011208 A1 Jan. 16, 2003

(30) Foreign Application Priority Data

Jul. 10, 2001 (JP) ........................................ 2001-209833

(51) Int. Cl.⁷ .................................................. B60J 7/08
(52) U.S. Cl. .................... 296/108; 296/107.01; 296/76; 296/107.17
(58) Field of Search ............................ 296/108, 107.01, 296/76, 136, 107.17

(56) References Cited

U.S. PATENT DOCUMENTS

| | | | | |
|---|---|---|---|---|
| 2,939,742 A | * | 6/1960 | Dardarian et al. | 296/108 |
| 4,729,592 A | * | 3/1988 | Tuchiya et al. | 296/107.16 |
| 4,796,943 A | * | 1/1989 | Fukutomi et al. | 296/107.17 |
| 5,584,522 A | * | 12/1996 | Kerner et al. | 296/108 |
| 5,746,470 A | * | 5/1998 | Seel et al. | 296/108 |
| 5,785,375 A | * | 7/1998 | Alexander et al. | 296/108 |
| 5,833,300 A | * | 11/1998 | Russke | 296/108 |
| 6,062,628 A | * | 5/2000 | Guillez | 296/108 |
| 6,092,335 A | * | 7/2000 | Queveau et al. | 296/76 |
| 6,145,915 A | * | 11/2000 | Queveau et al. | 296/76 |
| 6,299,234 B1 | * | 10/2001 | Seel et al. | 296/108 |
| 6,312,041 B1 | * | 11/2001 | Queveau et al. | 296/108 |
| 6,315,349 B1 | * | 11/2001 | Kinnanen | 296/108 |
| 6,390,532 B1 | * | 5/2002 | Mac Farland | 296/108 |

FOREIGN PATENT DOCUMENTS

JP 6-286470 A 10/1994

OTHER PUBLICATIONS

"Toyota Soala," Jidosha Kougaku (Automotive Engineering), vol. 6, pp. 66–75 (2001).

* cited by examiner

Primary Examiner—D. Glenn Dayoan
Assistant Examiner—Lori L Coletta
(74) Attorney, Agent, or Firm—Sughrue Mion, PLLC (57) ABSTRACT

A storage structure for convertible hardtop for effectively using a stored roof while no excessively large rear trunk is necessary. The storage structure is provided for storing a roof and a rear pillar of a convertible hardtop vehicle which has plural row forward-facing seats, in which the roof is substantially horizontally stored from the back side of a backrest of the most front seat in a manner such that the roof bestrides a parting line between the rear pillar and a trunk lid of the vehicle, and the rear pillar is stored under the roof.

9 Claims, 9 Drawing Sheets

STRUCTURE FOR STORING ROOF AND REAR PILLAR OF CONVERTIBLE HARDTOP

BACKGROUND OF THE INVENTION

1. Field of the Invention

The present invention relates to a structure for storing (or housing) a roof and a rear pillar of a convertible hardtop.

2. Description of the Related Art

Conventionally, convertible hardtop vehicles in which a roof panel can be stored are known. In this kind of vehicles, the driver has a feeling of openness when the roof is open, and while the roof is closed, an impression of sturdiness is provided as given by vehicles having a fixed roof structure.

The convertible hardtop vehicles have (i) a structure for storing a roof panel and a rear pillar into a rear trunk (refer to article "Toyota Soala", Jidosha Kougaku (Automotive Engineering), Vol. 6, pp. 66–75, 2001), or (ii) a structure for storing a roof panel and the like between a rear trunk and a seat (refer to Japanese Unexamined Patent Application, First Publication No. Hei 6-286470).

However, in the former structure in which the roof panel is stored in the rear trunk, the rear trunk must be excessively large; therefore, design or formation of the vehicle is considerably limited. If the area of the roof panel or the like is made small so as to use a small rear trunk, then the room space of the vehicle should also be small.

In the latter structure, the rear trunk can be smaller in comparison with the former structure. However, when the roof is stored, baggage on a back seat may be blown by the wind.

SUMMARY OF THE INVENTION

In consideration of the above circumstances, an object of the present invention is to provide a storage structure for convertible hardtop for effectively using a stored roof while no excessively large rear trunk is necessary.

Therefore, the present invention provides a storage structure for storing a roof (e.g., a roof 3 in an embodiment explained below) and a rear pillar (e.g., a rear pillar 4 in the embodiment explained below) of a convertible hardtop vehicle which has plural row forward-facing seats, in which the roof is substantially horizontally stored and the stored roof is positioned from the vicinity of the back side of a backrest (e.g., a backrest 13a in the embodiment explained below) of the most front seat (e.g., a front seat 13 in the embodiment explained below) in a manner such that the roof bestrides a parting line (e.g., a parting line K in the embodiment explained below) between the rear pillar and a trunk lid (e.g., a trunk lid 23 in the embodiment explained below) of the vehicle, and the rear pillar is stored under the roof.

According to the above structure, it is possible to employ a roof which is long in the longitudinal (i.e., front to rear) direction and is stored in a manner such that the roof bestrides the parting line. Therefore, the rear trunk need not have an unnecessarily large space so as to store the roof; thus, the flexibility of design and the appearance of the vehicle can be improved.

That is, a very large rear trunk, which is necessary for storing the roof and the rear pillar, is unnecessary; thus, the room of the vehicle can be larger so that a sufficient space for sitting on the front seat and the back seat can be provided. In comparison with the conventional structure in which the entire roof is stored in the rear trunk, even when the roof is open, the rear truck includes a sufficient space. Therefore, it is unnecessary to keep the rear trunk empty in consideration of storage of the roof; thus, it is very convenient.

As a typical example, the roof is positioned from the vicinity of the back side of the backrest of the most front seat to the vicinity of a backrest (e.g., a backrest 14a in the embodiment explained below) of the most back seat (e.g., a back seat 14 in the embodiment explained below), and the rear pillar is stored between the backrest of the most back seat and a rear trunk (e.g., a rear trunk 24 in the embodiment explained below) of the vehicle.

According to this structure, the roof, which is substantially horizontally positioned from the back side of the backrest of the most front seat to a backrest of the most back seat, is stored in a manner such that the roof covers a corresponding top area (of the vehicle body) above the back seat. In addition, the rear pillar is stored at a position by which the space in the rear trunk has no considerable decrease. Therefore, the space (covered by the roof) above the back seat can be used for keeping baggage and the baggage on the back seat is not blown by the wind while the vehicle is running. Accordingly, the space for keeping the baggage can be enlarged together with the rear trunk.

The backrest of the most front seat may have a divided upper portion (e.g., an upper portion 14b in the embodiment explained below) which is attached to a lower portion of the rear pillar. Accordingly, the height of the backrest of the back seat (which has a divided form and is stored together with the rear pillar) can be lower than that measured when the roof is opened, where the decreased height approximately corresponds to the height of the divided upper portion. Consequently, the roof, which is substantially horizontally arranged, can be stored at a lower position. Therefore, the appearance of the vehicle can be much improved.

As a typical example, the roof and the rear pillar are stored in a folded form therebetween. The folded form may be produced by a folding mechanism for forcing the roof and the rear pillar to have the folded form.

The stored roof and the trunk lid may form a continuous profile which is substantially horizontal.

In addition, a rear portion of the stored roof may be covered by a front portion of the trunk lid.

Additionally, an area above a back seat may be covered by the stored roof and is used for storage.

DESCRIPTION OF THE PREFERRED EMBODIMENTS

Figure 1:
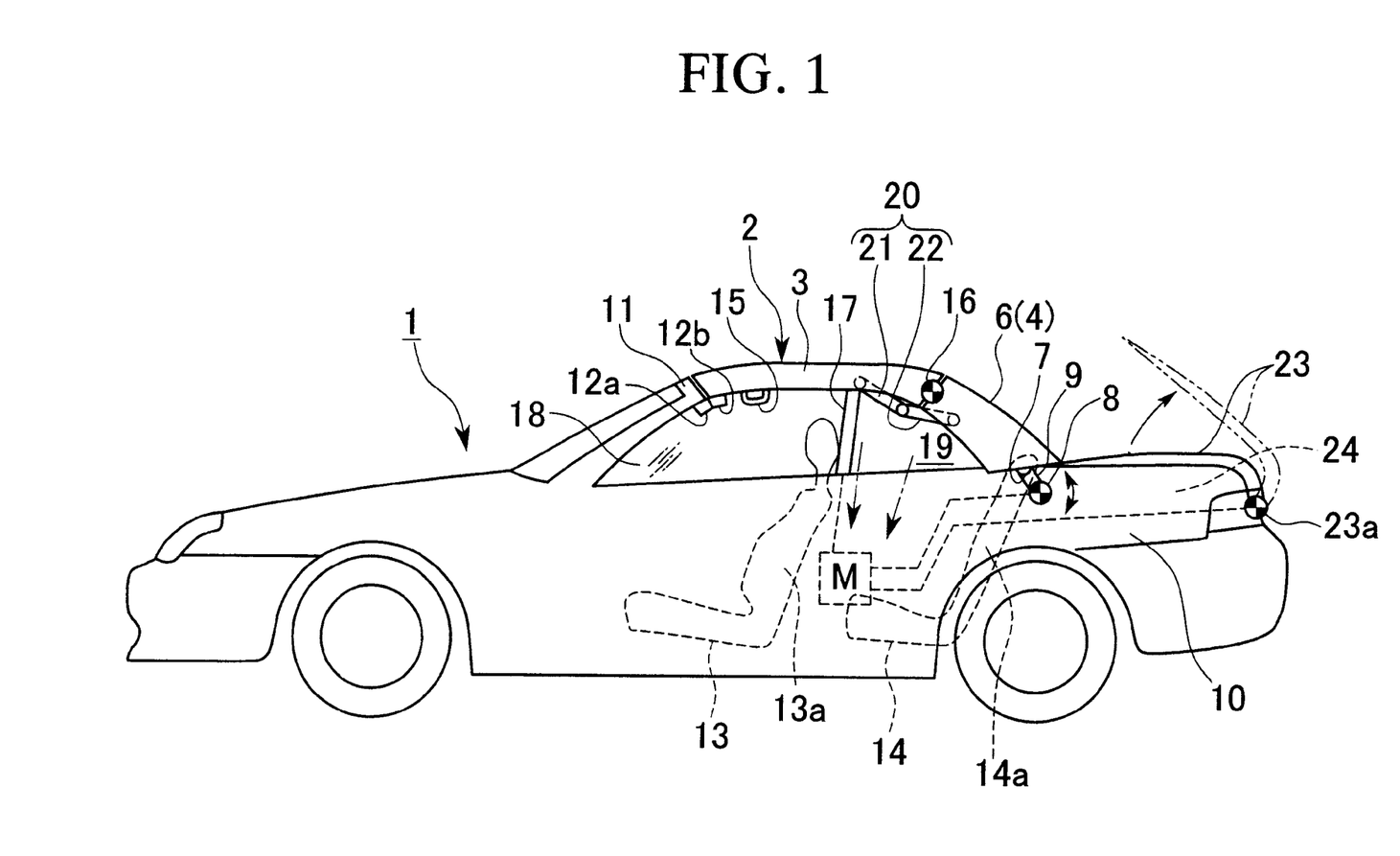
FIG. 1 is a side view showing a vehicle according to the first embodiment of the present invention, which is viewed when the roof is closed.
Figure 4:
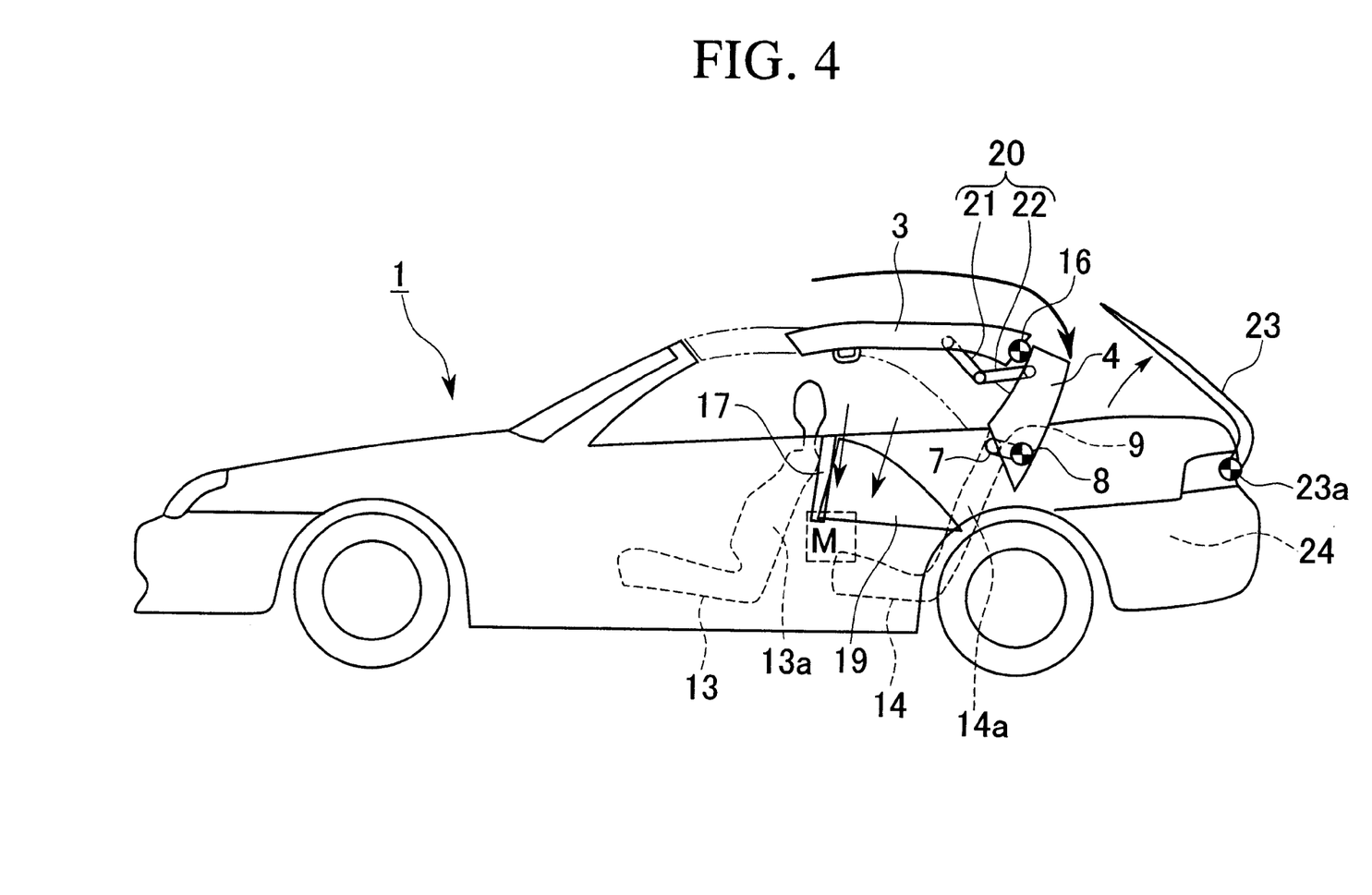
FIG. 4 is a side view showing a state in the operation in the first embodiment.
Figure 6:
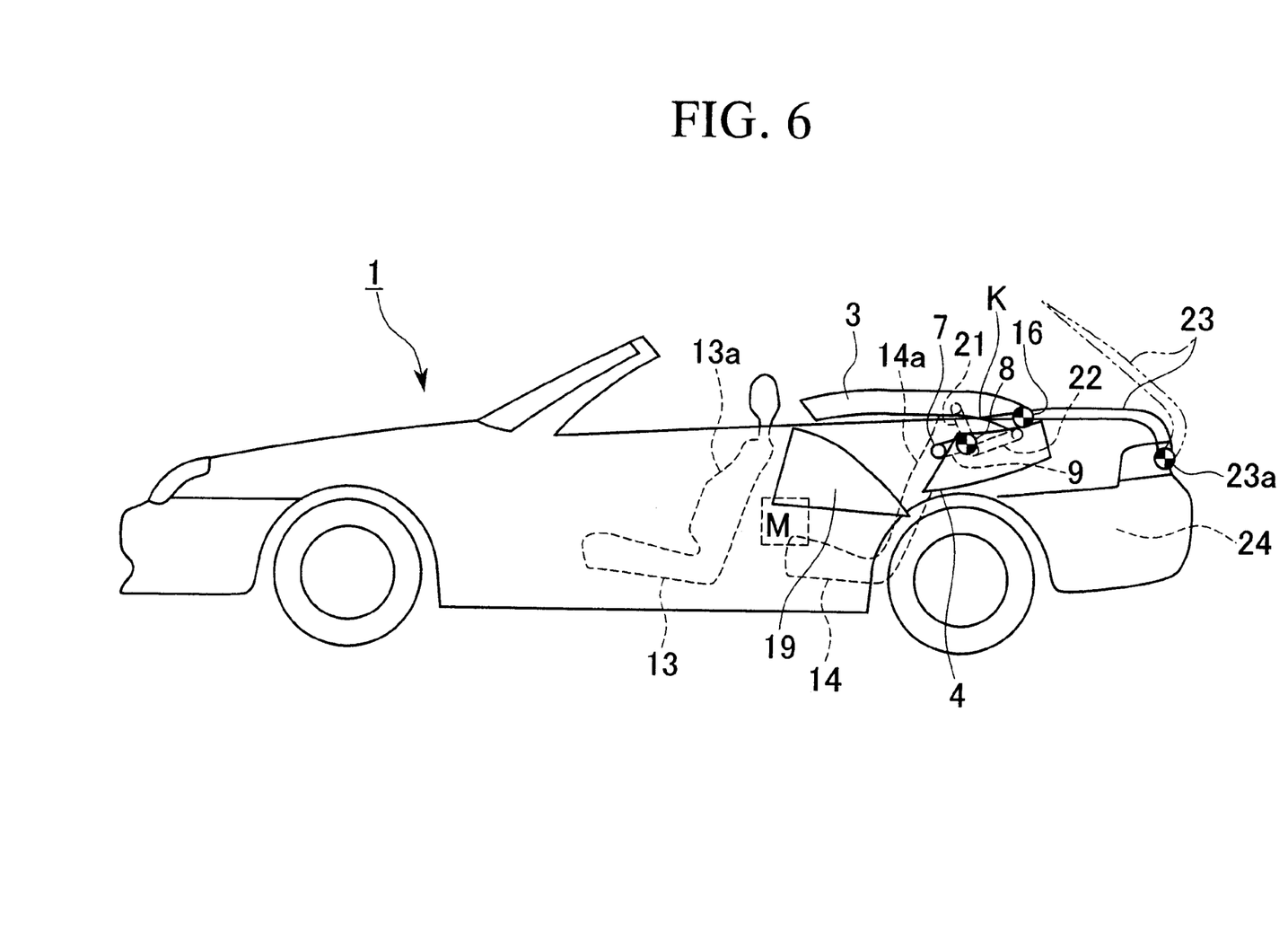
FIG. 6 is a side view showing the vehicle in the first embodiment, which is viewed when the roof is open.

Hereinafter, embodiments according to the present invention will be explained in detail with reference to the drawings. In FIGS. 1, 4, and 6 of the drawings, the roof, rear pillar, door glass, and the like, which move when being stored, are indicated by solid lines so as to clearly show a positional relationship between these movable portions.

Figure 2:
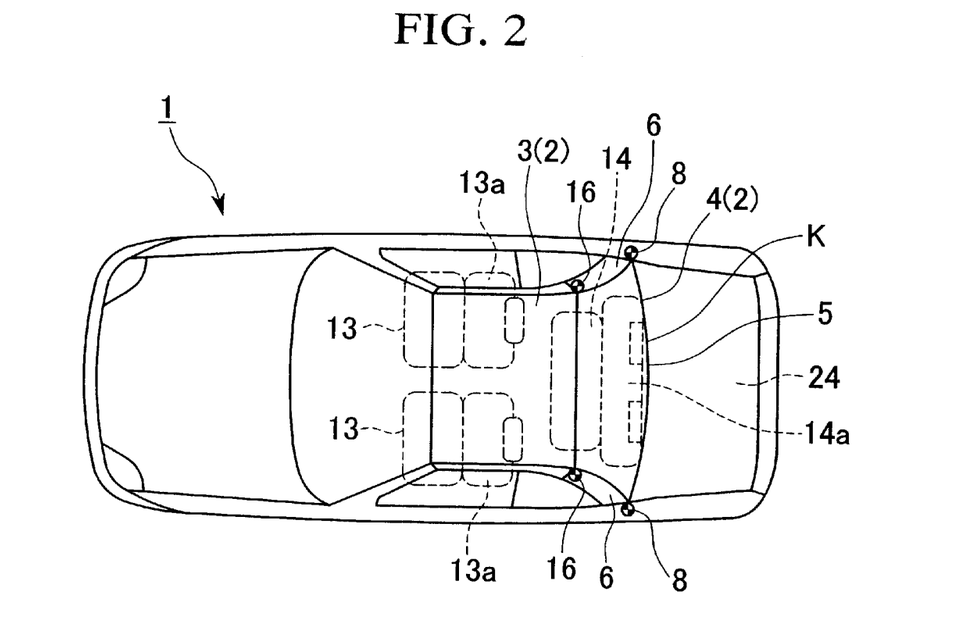
FIG. 2 is a plan view corresponding to FIG. 1.

FIG. 1 is a side view showing a convertible hardtop vehicle according to the first embodiment of the present invention, and FIG. 2 is a plan view of this vehicle.

In FIGS. 1 and 2, the top of a vehicle body 1 can be selectively opened and closed by using a roof section 2 which consists of a rear pillar 4 and a roof 3 which has a substantially plane shape. More specifically, the roof 3 is supported by the rear pillar 4 which is supported by the vehicle body 1, where the roof 3 can be stored by a folding function.

The rear pillar 4 consists of a rear wall 5 of the roof section 2 and rear pillar portions 6, and a bracket 7 is attached at a lower portion of each rear pillar portion 6. In addition, an end of a link 9, which is coupled with a drive shaft 8, is rotatably supported by each bracket 7. The drive shaft 8 is rotated by a motor M which is provided in a rear fender panel 10, and the link 9 is rotated according to the rotation of the drive shaft 8.

The roof 3 is detachably attached to a front roof rail 11 via lock members 12a and 12b. The locking and unlocking operation of the lock members 12a and 12b can be performed using a solenoid (not shown) or may be performed using the driving force of the motor M.

As shown in FIG. 2, the front end of the roof 3 has a linear shape, and when the front end is positioned at the back side of a backrest 13a of a front seat 13 (explained below), the roof 3, which is substantially horizontally positioned, can cover a corresponding top area (of the vehicle body 1) below which a backrest 14a of a back seat 14 and a parting line K between the rear pillar 4 and a trunk lid 23 (explained below) are positioned.

A grip 15 for easily opening or closing the roof 3 is attached at either side of the roof 3. The rear end of the roof 3 is supported in a bendable form by the front portion of the rear pillar 4 via roof hinges 16 provided at right and left sides of the rear end. The rear pillar 4 is stored under the roof 3.

As shown in FIG. 2, the seat system of this vehicle has plural seat rows, and specifically, two seat rows are provided here. The front row seat 13 consists of a driver's seat and a passenger seat (or assistant driver's seat), while the back seat 14 has an integral form (of right and left seats). The width of the back seat 14 (i.e., the length of the seat in the width direction of the vehicle) is smaller than that of the front seat so as to make the width of the back seat 14 smaller than the width of the roof 3.

Reference numeral 17 indicates a center pillar which is provided between a front door glass 18 of a door and a rear side glass 19, and this center pillar 17 descends by using the motor M before the operation of storing the roof section 2, so as not to obstruct the roof storing operation. Each of the rear side glass 19 and the front door glass 18 can also descend or ascend by using a glass lifter (not shown). The center pillar 17 and the rear side glass 19 may be integrated and this integrated part may be made to ascend or descend by using the motor M.

In addition, between the roof 3 and the rear pillar 4, a folding mechanism 20 is provided for forcing or assisting the roof 3 and the rear pillar 4 so as to produce a folded form of them. As is generally shown by FIG. 1, this folding mechanism 20 comprises a roof link 21 which is rotatably supported by the roof 3 and a pillar link 22 which is rotatably supported by the rear pillar 4, where the coupled roof link 21 and pillar link 22 are rotatably supported so as to bestride the junction between the roof 3 and the rear pillar 4.

The folding mechanism 20 may have (i) a spring for forcing the roof 3 and the rear pillar 4 so as to produce a folded form of them or (ii) a mechanism using a cylinder, for switching the form of the roof 3 and the rear pillar 4 between the folded form and the unfolded form. Such an switching operation between the folded form and the unfolded form may be performed using driving force produced by the motor M, that is, an operation cooperated with the motor M may be executed.

Reference numeral 23 indicates a trunk lid. The rear side of the trunk lid 23 is supported in a manner such that the trunk lid 23 can be opened or closed in the vehicle body 1. This opening or closing operation of the trunk lid 23 can be executed using the motor M. When the rear pillar 4 is stored, the trunk lid 23 is opened, not for storing the entire roof section 2, but for preventing interference with the rear pillar 4. That is, when the rear pillar 4 is stored, the rear pillar 4 occupies only a small space in the rear trunk 24. Therefore, a very large rear trunk 24, which is necessary for storing the entire roof section 2, is unnecessary. Accordingly, the rear trunk 24 can be small; thus, design limitation caused by a large rear trunk is not present and the appearance of the vehicle can be improved. In addition, reference numeral 23a indicates a lid hinge, and a parting line K between the rear pillar 4 and the trunk lid 23 of the rear trunk 24 indicates a boundary between the rear pillar 4 and the front end of the trunk lid 23.

Next, the function of the present embodiment will be explained with an example in which the closed roof is opened.

If the motor M is driven while the top open area of the upper portion of the vehicle body is closed by the roof section 2 (see FIGS. 1 and 2), the center pillar 17 descends and the trunk lid 23 is opened. The rear side glass 19 then descends due to the operation of the glass lifter (not shown).

Figure 3:
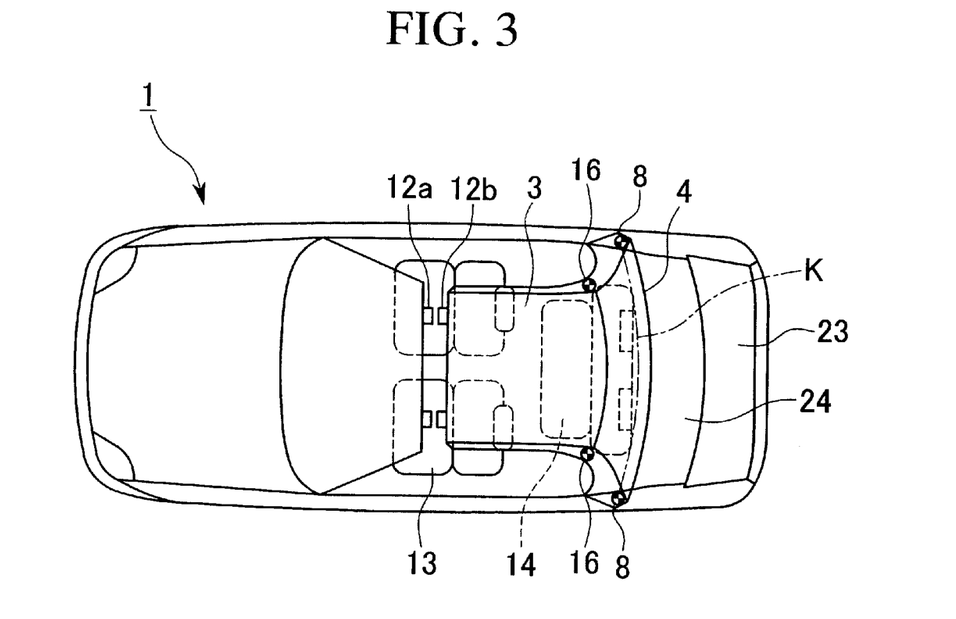
FIG. 3 is a plan view corresponding to FIG. 2, for showing a state in the operation.

In the next step, the locked state of the lock members 12a and 12b are released and the front side of the roof 3 separates from the front roof rail 11 (see FIG. 3).

Simultaneously with the release of the (locked) roof 3 from the front roof rail 11, the drive shaft 8 is rotated by the motor M, and accordingly, the link 9 rotates counterclockwise. As a result, as shown in FIG. 4, positions of the roof 3 and the rear pillar 4 are changed by the folding mechanism 20 via the roof link 21 and the pillar link 22 in a manner such that the angle between the roof 3 and the rear pillar 4 decreases. That is, the roof 3 moves backward and the rear pillar 4 rotates clockwise with respect to the bracket 7. In this process, the trunk lid 23 is open; thus, the rear pillar 4 can rotate without interfering with the trunk lid 23.

Figure 5:
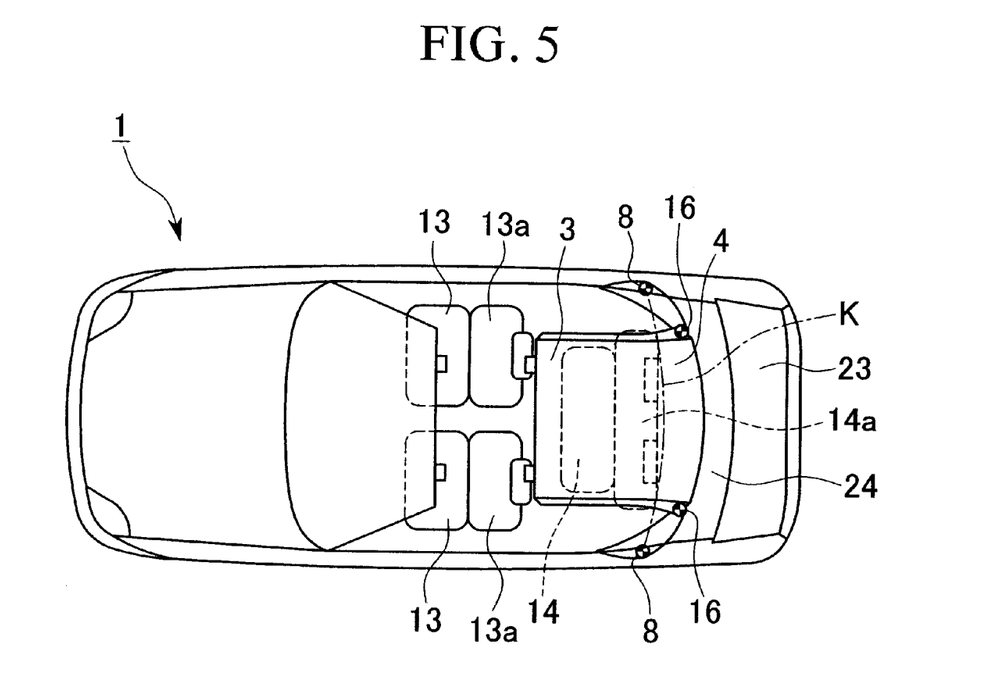
FIG. 5 is a plan view corresponding to FIG. 4.
Figure 7:
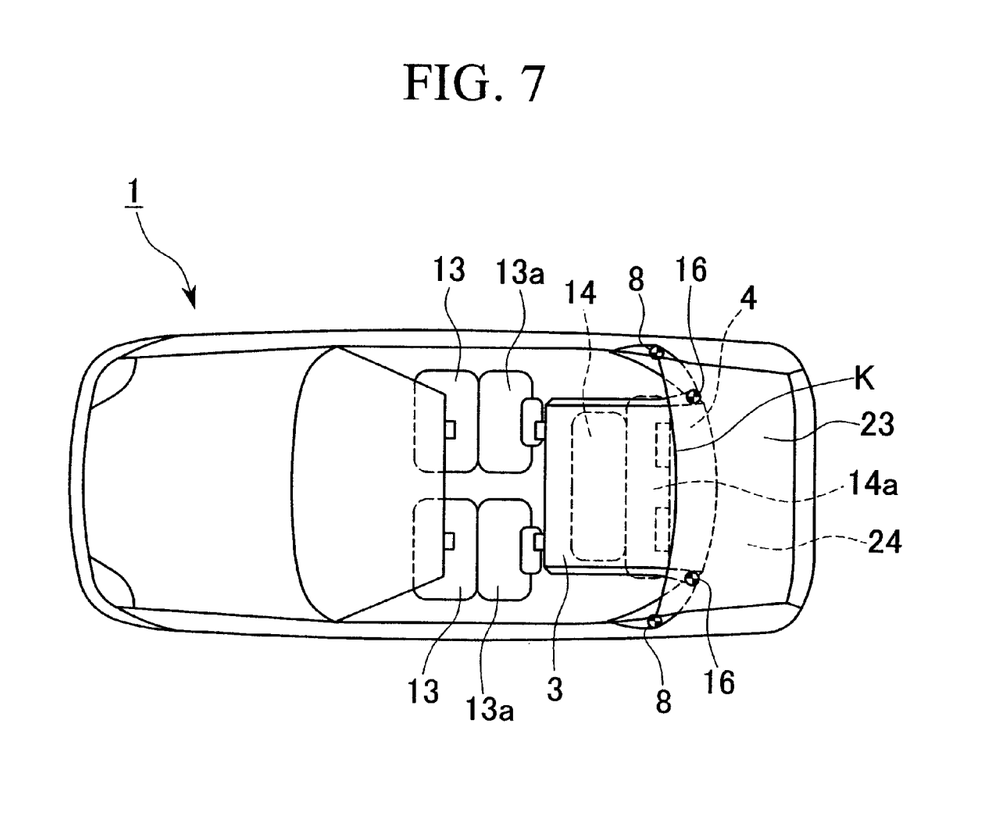
FIG. 7 is a plan view corresponding to FIG. 6.

The link 9 is further rotated by the motor M (see FIG. 5), and when the roof 3 is in a position for covering the upper face of the back seat 14, the trunk lid 23 is closed and the motor M is stopped (see FIGS. 6 and 7). According to this process, the roof 3 can be substantially horizontally positioned from (the vicinity of) the back side of the backrest 13a of the front seat 13 to the position of the backrest 14a of the back seat 14, and simultaneously, the rear pillar 4 can be stored between the rear trunk 24 and the backrest 14a of the back seat 14. Accordingly, the upper area of the vehicle body is opened, and the roof 3 is positioned so as to bestride the parting line K between the rear pillar 4 and the trunk lid 23.

On the other hand, in order to close the upper opening of the vehicle body by using the stored roof section 2, an operation reverse to the above-explained operation is executed. That is, as shown in FIG. 6 by a chain line, when the trunk lid 23 is opened and the drive shaft 8 is rotated clockwise by the motor M, the rear pillar 4 rises, and accordingly, the roof 3 moves upward from the upper face of the back seat 14 by the folding mechanism 20. In this action, the front side of the roof 3 moves towards the front roof rail 11 while the angle between the roof 3 and the rear pillar 4 increases.

The front side of the roof 3 is then engaged with the front roof rail 11 via the lock members 12a and 12b. After that, the center pillar 17 is made to ascend by using the motor M up to the height of the roof 3 and the rear side glass 19 is also made ascend. Accordingly, the upper opening of the vehicle body can be closed by the roof section 2 as shown in FIG. 1.

According to the above-explained embodiment, the roof 3, which is substantially and horizontally positioned from the vicinity of the back side of the backrest 13a of the front seat 13 to the vicinity of the backrest 14a of the back seat 14 in a manner such that the roof 3 bestrides the parting line K between the trunk lid 23 of the rear trunk 24 and the rear pillar 4, is stored in a manner such that the roof 3 covers the area above the back seat 14. In addition, the rear pillar 4 is stored under the roof 3 between the rear trunk 24 and the backrest 14a of the back seat 14.

Therefore, the above roof 3, in particular, one having a large length in the longitudinal (i.e., front to rear) direction and the rear pillar 4 can be effectively employed in a vehicle, thereby improving flexibility of the design for the room of the vehicle and the rear trunk 24. Also in this case, the rear trunk 24 need not have an unnecessarily large space so as to store a large roof 3. Therefore, the flexibility of design can further be improved, and thus a more desirable appearance of the vehicle can be obtained.

In addition, no large rear trunk for storing a large roof section is necessary; and accordingly, the room of the vehicle can be larger so that a sufficient space for sitting on the front seat 13 and the back seat 14 can be provided.

Additionally, different from the conventional structure in which the entire roof is stored in the rear trunk, even when the roof is open, the rear truck 24 includes a sufficient space. Therefore, it is unnecessary to keep the rear trunk 24 empty in consideration of storage of the roof; thus, it is very convenient.

In addition, the front side of the roof 3 is positioned close to the back face of the backrest 13a of the front seat 13 and also covers the back seat 14 even in the width direction of the vehicle, so that the space above the back seat 14 can be used for keeping baggage and the baggage on the back seat is not blown by the wind while the vehicle is running. Accordingly, the space for keeping the baggage can be enlarged together with the rear trunk 24. When baggage is kept on the back seat 14, a passenger sitting on the front seat 13 can easily put something into the baggage and take something from the baggage through a gap between the right and left seats belonging to the front seat 13.

In addition, the roof 3 is substantially horizontally arranged and the rear side of the stored roof 3 is close to the backrest 14a of the back seat 14; thus, the roof 3 can be conformably arranged at the back side of the front seat 13, where the rear side of the roof 3 almost matches the front side of the trunk lid 23. Therefore, the vehicle appearance can be improved.

Also in the present embodiment, a single motor M is used for (i) opening and closing the trunk lid 23, (ii) making the center pillar 17 ascend and descend, and (iii) rotating the rear pillar 4. Therefore, the number of necessary parts and components can be decreased.

Furthermore, the rear pillar 4 is stored at a position by which the space in the rear trunk 24 has no considerable decrease, that is, the space of the rear trunk 24 is not also narrowed by the rear pillar 4.

The second embodiment of the present invention will be explained with reference to FIGS. 8 to 10. In these figures, parts identical to those of the first embodiment are given identical reference numerals and explanations thereof are omitted.

Figure 8:
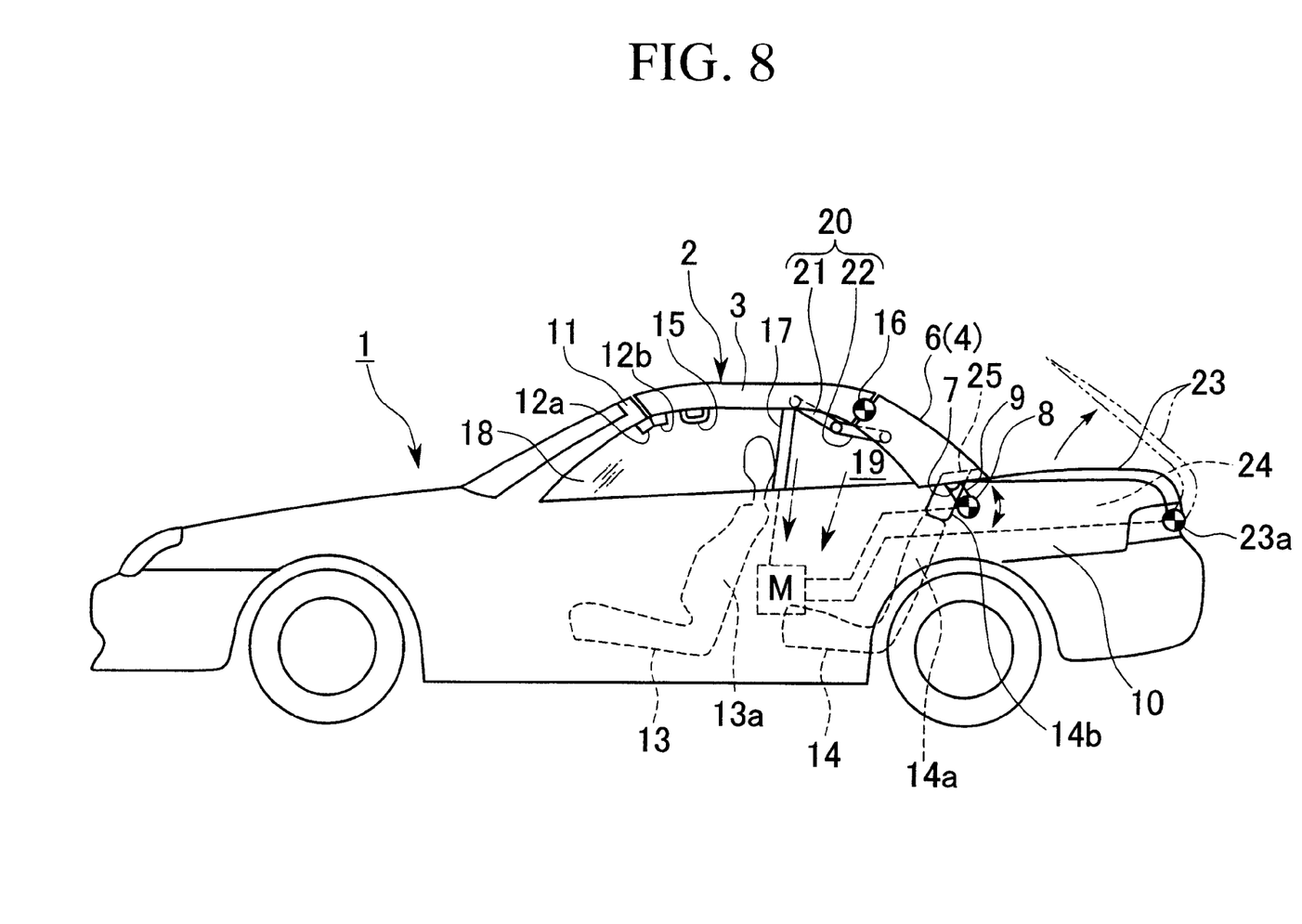
FIG. 8 is a side view corresponding to FIG. 1, which shows a vehicle according to the second embodiment of the present invention.
Figure 9:
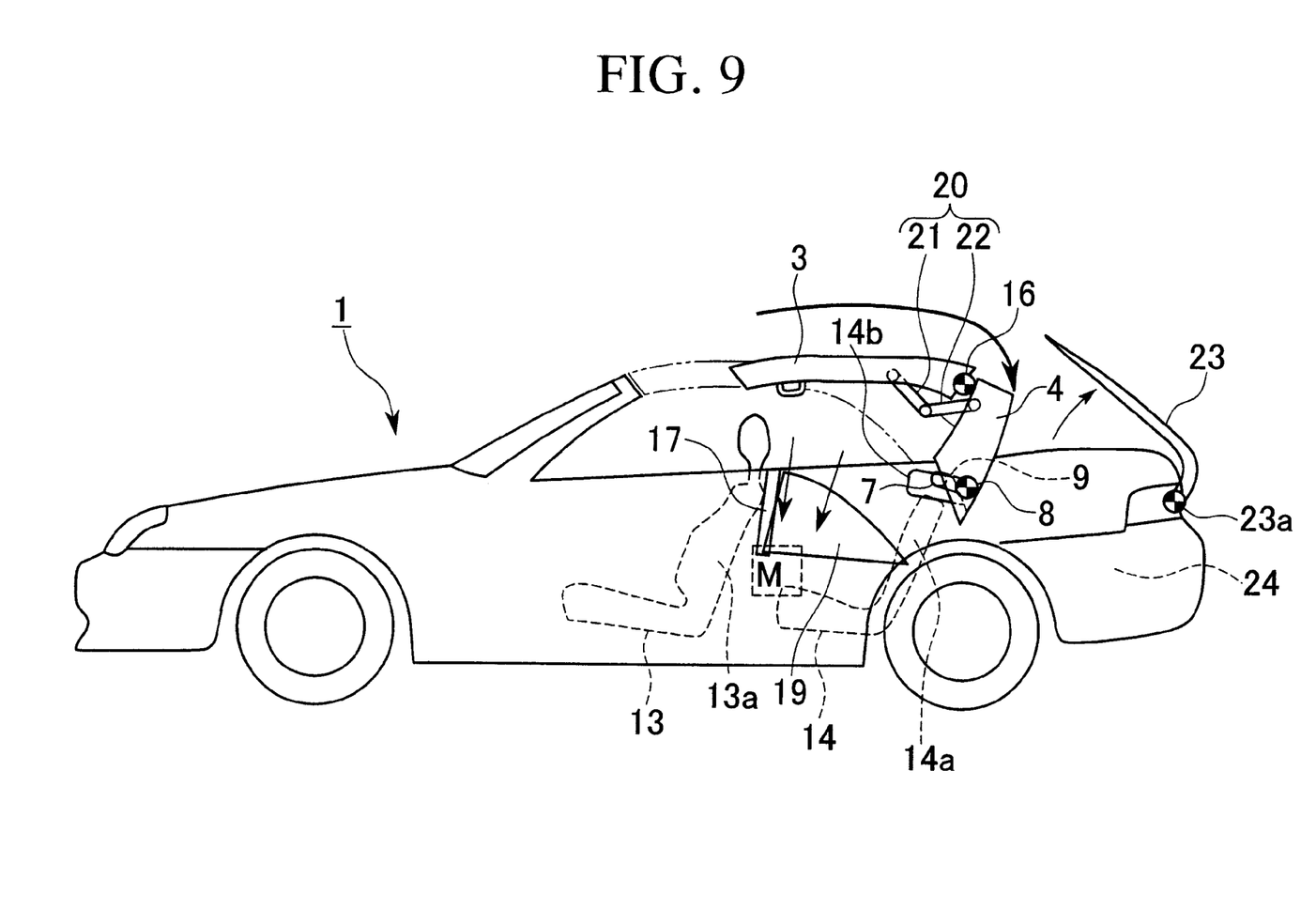
FIG. 9 is a side view corresponding to FIG. 4, which also shows the vehicle according to the second embodiment.

In the second embodiment, as shown in FIG. 8, the backrest 14a of the back seat 14 has two portions divided in the vertical direction and reference numeral 14b indicates the upper portion of the backrest 14a. This upper portion 14b is attached and fixed to a rear tray 25 which is attached to the rear pillar 4. Accordingly, in the present embodiment when the roof is closed, the backrest 14a of the back seat 14 has a normal height which includes the height of the upper portion 14b in a normal position (see FIG. 8). However, when the roof is stored (see FIG. 9), the position of the upper portion 14b of the backrest 14a is moved and the upper portion 14b is stored together with the rear pillar 4. Therefore, when the operation of storing the roof 3 is completed, as shown in FIG. 10, the height of the backrest 14a is lower than that measured when the roof is opened, were the decreased height approximately corresponds to the height of the upper portion 14b. Consequently, the roof 3, which is substantially horizontally arranged above the backrest 14a, can be stored at a lower position.

Figure 10:
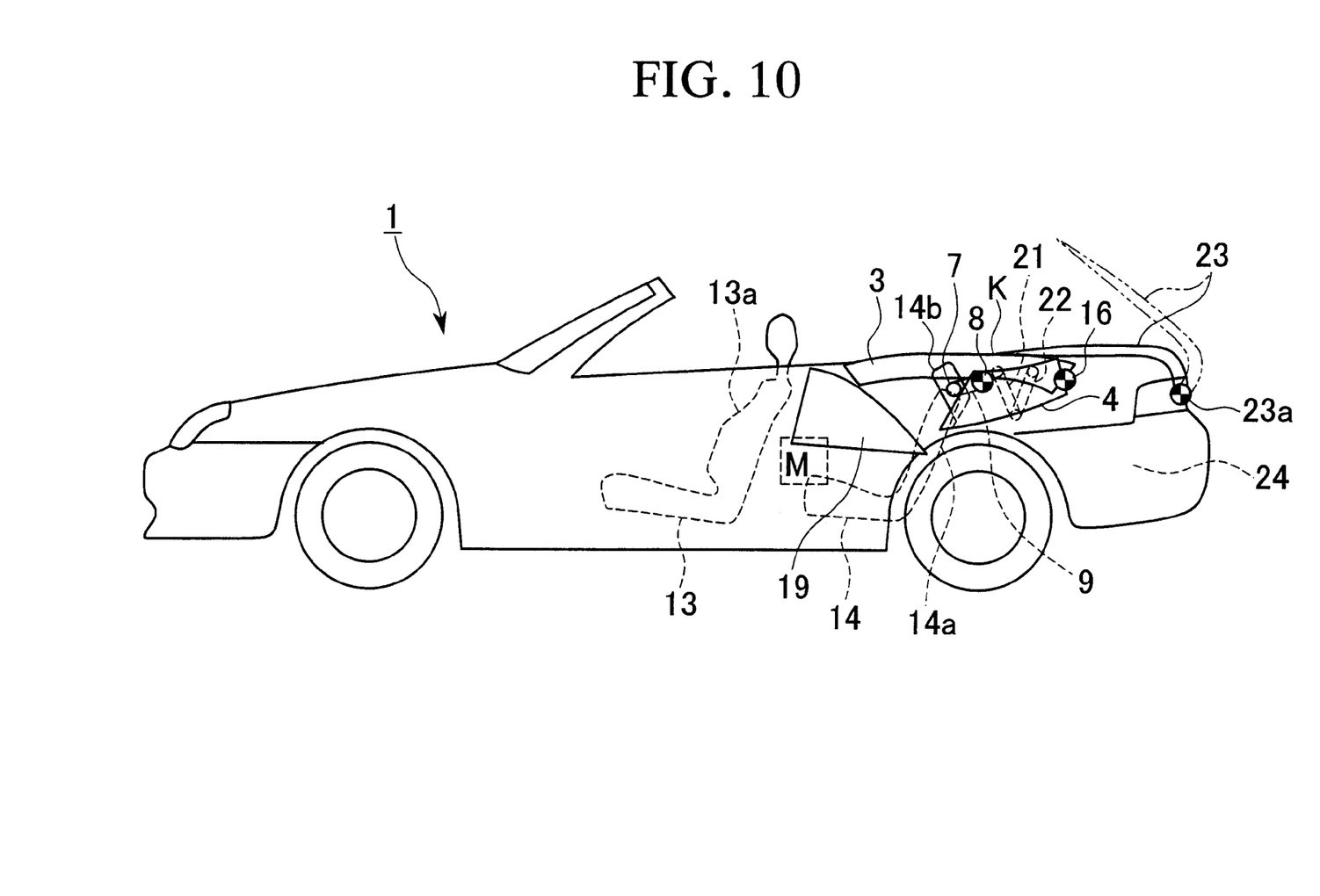
FIG. 10 is a side view corresponding to FIG. 6, which also shows the vehicle according to the second embodiment.

Therefore, in addition to the effects obtained by the previous embodiment, in the present embodiment, the appearance can be much improved due to a lower roof 3 stored as shown in FIG. 10.

The present invention is not limited to the above embodiments, and any mechanism for substantially horizontally arranging the roof 3 so as to bestride the parting line K between the rear pillar 4 and the trunk lid 23 of the rear trunk 24 and for storing the rear pillar 4 under the roof 3 may be employed.

Additionally, in the above embodiment, the vehicle has two seat rows. However, the present invention can be applied to a vehicle having three or four seat rows and a roof which can be partially or entirely opened and which is substantially horizontally stored so as to cover the upper portion of the back seat so as to bestride a parting line K as explained above.

What is claimed is:

1. A storage structure for storing a roof and a rear pillar of a convertible hardtop vehicle which has more than one row of forward-facing seats, in which the roof is substantially horizontally stored and the stored roof is positioned from the vicinity of the back side of a backrest of a front most seat in a manner such that the roof bestrides a parting line between the rear pillar and a trunk lid of the vehicle, and the rear pillar is stored under the roof.

2. A storage structure as claimed in claim 1, wherein the roof is positioned from the vicinity of the back side of the backrest of the front most seat to the vicinity of a backrest of a back most seat, and the rear pillar is stored between the backrest of the back most seat and a rear trunk of the vehicle.

3. A storage structure as claimed in claim 1, wherein a backrest of a back most seat has a divided upper portion which is attached to a lower portion of the rear pillar.

4. A storage structure as claimed in claim 2, wherein the backrest of the back most seat has a divided upper portion which is attached to a lower portion of the rear pillar.

5. A storage structure as claimed in claim 1, wherein the roof and the rear pillar are stored in a folded form therebetween.

6. A storage structure as claimed in claim 5, wherein the folded form is produced by a folding mechanism for forcing the roof and the rear pillar to have the folded form.

7. A storage structure as claimed in claim 1, wherein the stored roof and the trunk lid form a continuous profile which is substantially horizontal.

8. A storage structure as claimed in claim 1, wherein a rear portion of the stored roof is covered by a front portion of the trunk lid.

9. A storage structure as claimed in claim 1, wherein an area above a back seat is covered by the stored roof and is used for storage.

* * * * *